Feb. 19, 1946.  R. H. WHISLER, JR  2,395,027
SHOCK ABSORBER
Filed Aug. 28, 1944

INVENTOR.
RALPH H. WHISLER Jr.
BY
Whittemore Hulbert & Belknap
ATTORNEYS

Patented Feb. 19, 1946

2,395,027

UNITED STATES PATENT OFFICE 2,395,027

SHOCK ABSORBER

Ralph H. Whisler, Jr., Monroe, Mich., assignor to Monroe Auto Equipment Company, Monroe, Mich., a corporation of Michigan Application August 28, 1944, Serial No. 551,528

16 Claims. (Cl. 188—88)

This invention relates generally to shock absorbers and refers more particularly to hydraulic shock absorbers of the direct acting type.

One of the essential objects of the invention is to provide a shock absorber structure wherein a single valve normally closes two sets of passages in a piston and is operable during movement of the piston in one direction, i. e., on the compression stroke of the piston, to resist the flow of hydraulic medium through both sets of passages and thereby offer a primary stage of resistance.

Another object is to provide a shock absorber structure wherein another valve entirely free of the piston is operable during movement of the piston in the direction aforesaid to cut off the flow of hydraulic medium to one of the two sets of passages mentioned so that the single valve aforesaid will resist the flow of hydraulic medium through the second set of passages to offer a secondary stage of resistance.

Another object is to provide a shock absorber structure wherein a spring retainer for the single valve aforesaid has a series of passages registering with a corresponding series of passages in the piston through which hydraulic medium is adapted to flow during movement of the piston in a direction opposite to the direction aforesaid, i. e., on the rebound stroke of the piston.

Another object is to provide a shock absorber wherein the flow of hydraulic medium through the registering passages is under the control of a single valve carried by a retaining member on the piston rod.

Another object is to provide a shock absorber wherein the retaining member just mentioned cooperates with a shoulder of the piston rod to hold the piston and spring retainer aforesaid in assembled relation on the rod and carries a spring for the last mentioned single valve.

Another object is to provide a shock absorber that is simple and compact in construction, economical to manufacture, and efficient in operation.

Other objects, advantages and novel details of construction of this invention will be made more apparent as this description proceeds, especially when considered in connection with the accompanying drawing, wherein.

Figure 2:
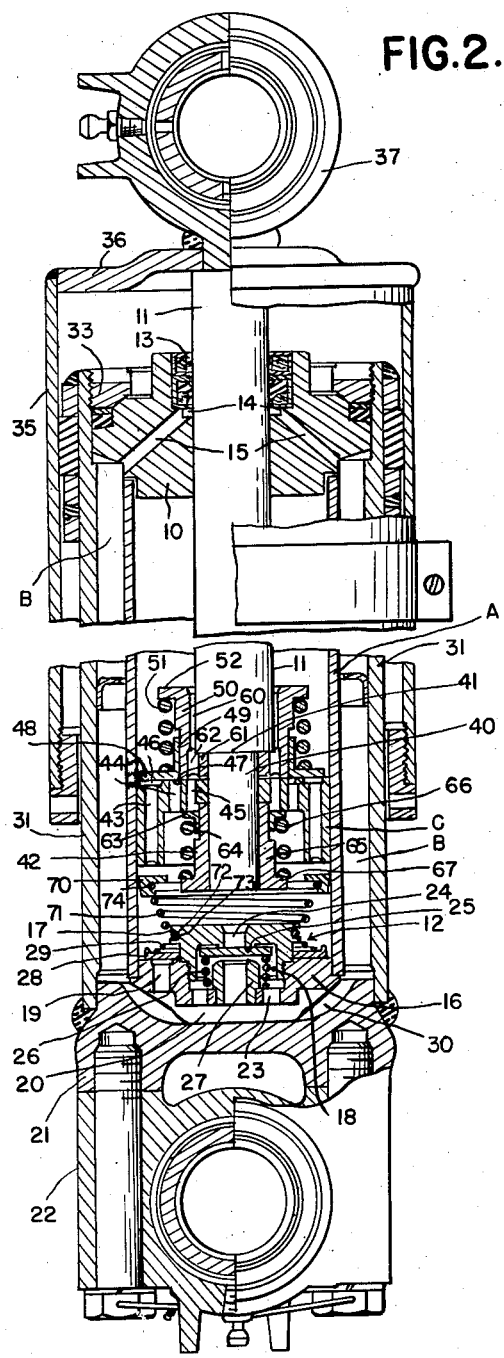
Fig. 2 is a fragmentary elevational view taken at substantially right angles to Fig. 1, with parts broken away and in section.
Figure 1:
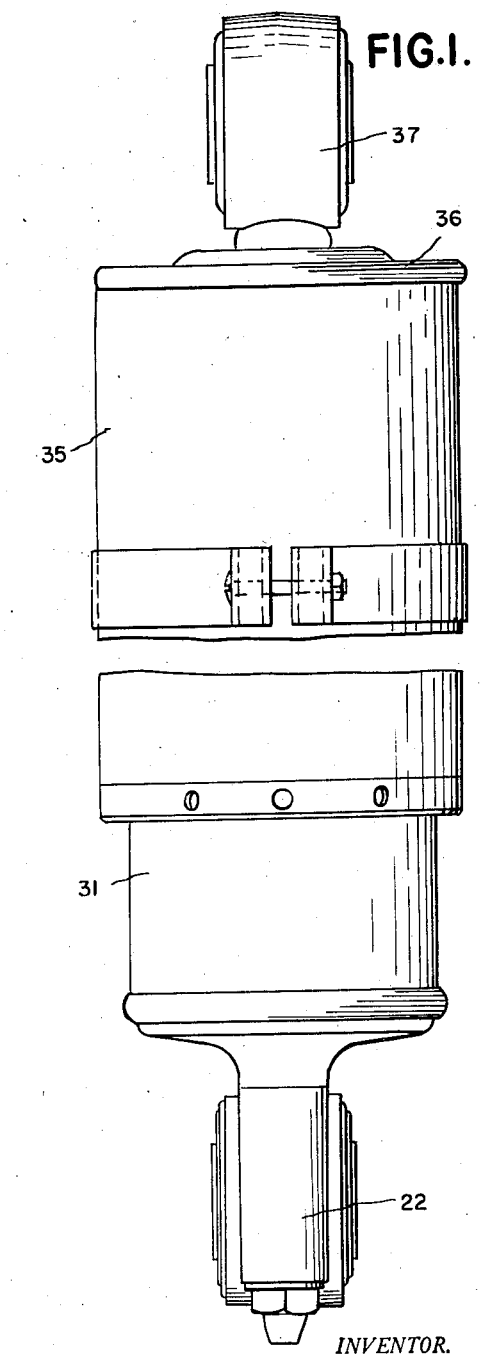
Fig. 1 is a fragmentary elevational view of a shock absorber structure embodying my invention.

Referring now to the drawing, A is the pressure cylinder containing a hydraulic medium, B is the reserve chamber for the hydraulic medium, and C is the reciprocating piston of a shock absorber structure embodying my invention.

As shown, the pressure cylinder A is provided at one end with a closure 10 that is apertured to receive a rod 11 for the piston, and is provided at its other end with a valve assembly 12 for controlling the flow of hydraulic medium between the cylinder A and reserve chamber B.

The closure 10 contains a seal 13 encircling the rod 11 and preventing the escape of hydraulic medium along the rod to the exterior of the cylinder A, a pocket 14 for receiving hydraulic medium wiped or scraped off the rod by the seal 13, and one or more passages 15 for conducting such hydraulic medium from the pocket 14 to the reserve chamber B. The valve assembly 12 has a body 16 rigid with the cylinder A and a locking nut 17 threadedly engaging the body 16 and cooperating therewith to form an enclosure 18. The body 16 has one series of circular passages 19 for hydraulic medium outside the enclosure 18 and extending between the cylinder A and a recess 20 in the inner section 21 of an attaching head 22 for the shock absorber, and has another series of passages 23 extending between the interior of the enclosure 18 and the recess 20. The locking nut 17 has a central passage 24 extending between the cylinder A and the enclosure 18. A valve 25 controls the flow of hydraulic medium through the central passage 24 in the nut 17 and is normally held in closed position by means of a coil spring 26 sleeved upon a member 27 fixed to the body 16 and forming an abutment or stop for the valve 25. A valve 28 controls the flow of hydraulic medium through the passages 19 and is normally held in closed position by a coil spring 29 encircling the nut 17. Preferably the section 21 of the attaching head 22 has circumferentially spaced ribs 30 that form seats for the body 16 of the valve assembly and provide therebetween suitable passages for hydraulic medium between the recess 20 and reserve chamber B.

The reserve chamber B is located between the cylinder A and an outer tubular casing 31 that is substantially concentric with the cylinder A and is sleeved upon the closure 10 and inner section 21 of the attaching head 22. Preferably the casing 31 is detachably connected by a nut 33 to the closure 10 and is rigidly secured, preferably by a welding operation, to the section 21 of the attaching head 22.

Located outside and substantially concentric with the casing 31 is a tubular dust shield 35 that is rigidly secured to a plate 36 on the piston rod 11 at the outer end thereof. An attaching head 37 is fixed to the rod 11 and plate 36 and cooperates with the attaching head 22 to support the shock absorber from relatively movable parts (not shown) of a motor vehicle.

The piston C is mounted upon a reduced inner end portion 40 of the rod between a shoulder 41 thereof and a retaining sleeve 42, and has three sets of substantially parallel passages 43, 44 and 45 respectively for hydraulic medium extending therethrough at spaced points thereof. Preferably the piston C has annular recesses 46 and 47 respectively at one end of the passages 43 and 44. A single plate-type valve 48 covers both recesses 46 and 47 and has an annular flange 49 slidably mounted on a retainer sleeve 50. A coil spring 51 encircles the sleeve 50 between a flange 52 thereof and the valve 48 and normally holds the latter in closed position against the piston C. The sleeve 50 encircles the rod 11 and is preferably spaced therefrom to provide an annular passage 60 for hydraulic medium.

A laterally extending portion 61 of the sleeve encircles the reduced end portion 40 of the rod between the shoulder 41 thereof and the piston and has a series of passages 62 therethrough for hydraulic medium registering with the passages 45 in the piston and opening into the annular passage 60. A single plate-type valve 63 controls the flow of hydraulic medium through the registering passages 45 and 62 and annular passage 60 and is provided with an annular flange 64 that is slidably mounted on a retainer sleeve 65 threadedly engaging the reduced end portion 40 of the rod. A coil spring 66 encircles the sleeve 65 between a flange 67 and the valve 63 and normally holds the latter in closed position against the piston.

Located within the cylinder A between the valve assembly 12 and piston C and entirely free of the latter is an annular valve member 70 of inverted substantially L cross-section that is yieldably supported in spaced relation to the passages 43 in the piston C by means of a coil spring 71 carried by the adjusting nut 17 of the valve assembly 12. Preferably the lowermost convolution 72 of the spring rests within a recess 73 in the nut 17, while the upper convolution 74 of said spring engages and forms a seat for the underside of the valve 70.

In use, when the attaching heads 22 and 37 of the shock absorber are moved slowly toward each other on the compression stroke of the piston C during easy or boulevard riding conditions, the hydraulic medium in the lower portion of the cylinder below the piston will initially flow upwardly through the vertically extending passages 43 and 44 in the piston past the single valve 48 to the space in the cylinder above the piston. However, should the shock absorber movement, due to rougher riding conditions, increase on the compression stroke to the point where the piston C abuts the annular valve 70, then the upward flow of hydraulic medium through the outer passages 43 will be cut off and such upward flow will then be through the passages 44 past the valve 48 to the space in the cylinder above the piston. Thus, during normal operation of the shock absorber on the compression stroke of the piston, the valve 48 alone will function to provide a low stage of resistance to the flow of hydraulic medium through both passages 43 and 44, while during abnormal operation of the shock absorber on the compression stroke of the piston the valve 48 alone will function to provide a secondary high stage of resistance to the flow of hydraulic medium through the passages only after the annular valve 70 has cut off the flow of hydraulic medium through the passages 43. During the compression stroke of the piston C the valve 25 of the valve assembly 12 will function in the usual manner to control the downward flow of hydraulic medium through the central passage 24 of the enclosure 18 to the reserve chamber B via the passages 23 and recess 20.

On the rebound stroke of the piston C the hydraulic medium in the cylinder A above the piston will flow through the annular passage 60 and registering passages 62 and 45 past the valve 63 to the lower portion of the cylinder below the piston. Also hydraulic medium will flow from the reserve chamber B through the passages 19 past the valve 28 into the lower portion of the cylinder A below the piston C.

In view of the foregoing, it will be apparent that hydraulic medium is adapted to flow simultaneously through the passages 43 and 44 in the piston C during the initial movement of the piston on its compression stroke; is adapted to flow through the passages 44 only during the secondary movement of the piston on its compression stroke; and is adapted to flow through the annular passage 60 and registering passages 45 and 62 during the rebound stroke of the piston. When the annular valve 70 is in open position relative to the piston C the single valve 48 controls the flow of hydraulic medium through both passages 43 and 44. When the annular valve 70 is in closed position relative to the piston C, the same valve 48 controls the flow of hydraulic medium through the passages 44. The single valve 63 controls the flow of hydraulic medium through the annular passages 60 and registering passages 45 and 62. Hence provision is made for two stages of resistance on the compression stroke and one on the rebound stroke of the piston.

What I claim as my invention:

1. A hydraulic shock absorber having a cylinder containing a hydraulic medium, a piston slidable in the cylinder and having two sets of passages through which hydraulic medium is adapted to flow during movement of the piston in one direction in the cylinder, and a valve normally closing both sets of passages and operable during movement of the piston in said direction to resist the flow of hydraulic medium through both sets of passages, means entirely free of the piston and operable during continued movement thereof in said direction to cut off the supply of hydraulic medium to one of the two sets of passages, the valve aforesaid being operable when the supply aforesaid to said one set of passages is cut off to resist the flow of hydraulic medium through the second set of passages.

2. A hydraulic shock absorber having a cylinder containing a hydraulic medium, a piston slidable in the cylinder and having two sets of passages through which hydraulic medium is adapted to flow during movement of the piston in one direction in the cylinder, a valve normally closing both sets of passages and operable during movement of the piston in said direction to resist the flow of hydraulic medium through both sets of passages, and a member yieldably supported in the cylinder in spaced relation to the piston and operable during continued movement of the piston in said direction to cut off the supply of hydraulic medium to one of the two sets of passages, the valve aforesaid being operable when the supply aforesaid to said one set of passages is cut off to resist the flow of hydraulic medium through the second set of passages.

3. A hydraulic shock absorber having a cylinder containing a hydraulic medium, a piston slidable in the cylinder and having two sets of passages through which hydraulic medium is adapted to flow during movement of the piston in one direction in the cylinder, and two independent closures for one set of passages, one of said closures being movable with said piston and normally closing said one set of passages, said one closure being operable to resist the flow of hydraulic medium through said one set of passages, the other of said closures being free of but engageable with said piston during travel of the piston in said direction to cut off the supply of hydraulic medium to said one set of passages, said one closure first mentioned being adapted when the supply aforesaid to said one set is cut off to resist the flow of hydraulic medium through the second set of passages.

4. A hydraulic shock absorber having a cylinder containing a hydraulic medium, a piston slidable in the cylinder and having two sets of passages through which hydraulic medium is adapted to flow during movement of the piston in one direction in the cylinder, a single means carried by the piston and normally closing simultaneously both sets of passages, said single means being adapted during movement of the piston in said direction to resist the flow of hydraulic medium through said passages, and means entirely free of the piston and operable during continued movement thereof in said direction to cut off the supply of hydraulic medium to one of the two sets of passages, the first mentioned means being operable when the supply aforesaid to said one set of passages is cut off to resist the flow of hydraulic medium through the second set of passages.

5. A hydraulic shock absorber having a cylinder containing a hydraulic medium, a piston slidable in the cylinder and having two sets of passages through which hydraulic medium is adapted to flow during movement of the piston in one direction in the cylinder, and two closures for one set of passages, one of said closures normally engaging said piston and operable during movement of the piston in said one direction to resist the flow of hydraulic medium through said two sets of passages, the other of said closures being free of but engageable with the piston during travel of the piston in said direction to cut off the supply of hydraulic medium to said one set of passages, said one closure first mentioned being adapted when the supply aforesaid to said one set is cut off to resist the flow of hydraulic medium through the second set of passages.

6. A hydraulic shock absorber having a cylinder containing a hydraulic medium, a piston slidable in the cylinder and having two sets of passages through which hydraulic medium is adapted to flow during movement of the piston in one direction in the cylinder, a single closure for the two sets of passages, said closure being normally closed but operable to resist the flow of hydraulic medium through both sets of passages, and a closure for one of the two sets of passages, the last mentioned closure being normally open but operable during travel of the piston in said direction to cut off the supply of hydraulic medium to said one set of passages.

7. A hydraulic shock absorber having a cylinder containing a hydraulic medium, a piston slidable in the cylinder and having two sets of passages through which hydraulic medium in the cylinder is adapted to flow upon movement of the piston in one direction in the cylinder, a single means carried by the piston and normally closing both sets of passages, said single means being adapted during initial movement of the piston in said direction to offer one stage of resistance to the flow of hydraulic medium through said passages, and a normally open closure for one of the two sets of passages, said closure being in the path of the piston when moving in the one direction aforesaid and operable after the piston has moved a predetermined distance in said direction to cut off the flow of hydraulic medium through said one set of passages, the closing means aforesaid being operable after the flow of said medium through said one set of passages is cut off to offer a different stage of resistance to the flow of hydraulic medium through the other of said two sets of passages.

8. A hydraulic shock absorber having a cylinder containing a hydraulic medium, a piston slidable in the cylinder and having two sets of passages through which hydraulic medium in the cylinder is adapted to flow upon movement of the piston in one direction in the cylinder, a valve normally closing both sets of passages, and a member free of but engageable with the piston when it reaches a predetermined point during travel thereof in the direction aforesaid for cutting off the flow of hydraulic medium through one of the two sets of passages.

9. A hydraulic shock absorber having a cylinder containing a hydraulic medium, a piston slidable in the cylinder and having three sets of passages through which hydraulic medium in the cylinder is adapted to flow upon movement of the piston in the cylinder, a valve normally closing two of the three sets of passages, a valve normally closing the third set of passages, and means operable to cut off the supply of hydraulic medium to one of said two sets of passages during movement of the piston in the one direction.

10. A hydraulic shock absorber having a cylinder containing a hydraulic medium, a piston slidable in the cylinder and having three sets of passages through which hydraulic medium in the cylinder is adapted to flow upon movement of the piston in the cylinder, and members above and below the piston operable to control the flow of hydraulic medium through two of the three sets of passages during movement of the piston in the one direction, one of said members being connected to the piston and normally closing both of said two sets of passages, another of said members being free of the piston but operable when it reaches a predetermined point during travel thereof in the direction aforesaid to cut off the flow of hydraulic medium to one of said two sets of passages.

11. A hydraulic shock absorber having a cylinder containing a hydraulic medium, a piston slidable in the cylinder and having two sets of passages through which hydraulic medium in the cylinder is adapted to flow upon movement of the piston in one direction in the cylinder, a single means carried by the piston and normally closing both sets of passages, said single means being adapted to offer a low stage of resistance to the flow of hydraulic medium through said passages, and means operable when movement of the piston in the direction aforesaid is increased to cut off the flow of hydraulic medium to one of the two sets of passages, said single means being operable when the flow of hydraulic medium through said one set of passages is cut off to offer a secondary high stage of resistance to the flow of hydraulic medium through the other of said two sets of passages.

12. A hydraulic shock absorber having a cylinder containing a hydraulic medium and provided at one end with a valve assembly, a piston movable within the cylinder and having two sets of passages through which hydraulic medium in the cylinder is adapted to flow during movement of the piston toward the valve assembly, a single means carried by the piston and normally closing both sets of passages, said single means being adapted during movement of the piston toward said valve assembly to resist the flow of hydraulic medium through both sets of passages, and means operable during movement of the piston toward said valve assembly for cutting off the flow of hydraulic medium to one of said two sets of passages, the last mentioned means being yieldably supported from said valve assembly in the path of and engageable with the piston.

13. A hydraulic shock absorber having a cylinder containing a hydraulic medium and provided at one end with a valve assembly, a piston movable within the cylinder and having two sets of passages through which hydraulic medium in the cylinder is adapted to flow during movement of the piston toward the valve assembly, means operable during movement of the piston toward said valve assembly for resisting the flow of hydraulic medium through both sets of passages, said means including a valve carried by the piston and normally closing both sets of passages, and means operable when the piston is moving toward the valve assembly to cut off the flow of hydraulic medium to one of said two sets of passages, the last mentioned means including a member yieldably supported from the valve assembly in the path of and engageable with said piston.

14. A hydraulic shock absorber having a cylinder containing a hydraulic medium, a piston slidable in the cylinder and having two sets of passages through which hydraulic medium in the cylinder is adapted to flow upon movement of the piston in one direction, a valve carried by the piston and adapted to resist the flow of hydraulic medium simultaneously through said two sets of passages, and a valve free of but engageable with the piston during travel of the piston in said one direction to cut off the supply of hydraulic medium to one of said two sets of passages, the first mentioned valve being adapted when the supply aforesaid to said one set of passages is cut off to resist the flow of hydraulic medium through the other of said two sets of passages.

15. A hydraulic shock absorber having a cylinder containing a hydraulic medium, a piston slidable in the cylinder and having two sets of passages through which hydraulic medium is adapted to flow during movement of the piston in one direction in the cylinder, and two closures for one of the two sets of passages, one of said closures being carried by said piston and normally closing both sets of passages, said one closure being adapted during movement of the piston in said one direction to resist the flow of hydraulic medium through both sets of passages, the other of said closures being yieldably supported within said cylinder in the path of said piston and engageable with said piston during travel of the piston in said direction to cut off the supply of hydraulic medium to said one set of passages.

16. A hydraulic shock absorber having a cylinder containing a hydraulic medium, a piston slidable in the cylinder and having two sets of passages through which hydraulic medium in the cylinder is adapted to flow upon movement of the piston in one direction in the cylinder, a single means carried by the piston and normally closing both sets of passages, and means operable upon a predetermined movement of the piston in the direction aforesaid for cutting off the flow of hydraulic medium through one of the two sets of passages, the single means aforesaid being adapted to resist the flow of hydraulic medium through said two sets of passages before the flow through said one set is cut off and adapted to resist the flow of hydraulic medium through the second set of passages after the flow through said one set is cut off.

RALPH H. WHISLER, Jr.